United States Patent [19]

Hotine

[11] 4,332,239

[45] Jun. 1, 1982

[54] SUN POWERED AUTOMATIC SUN FOLLOWING REFLECTOR

[76] Inventor: William Hotine, Box 216, Albion, Calif. 95410

[21] Appl. No.: 201,080

[22] Filed: Oct. 27, 1980

[51] Int. Cl.³ .................. F24J 3/02; G05D 11/00; G01J 1/20
[52] U.S. Cl. .................. 126/425; 126/438; 136/236R; 250/203 R
[58] Field of Search .............. 126/425, 424, 438; 136/89 PC, 89 H; 250/203; 353/3

[56] References Cited

U.S. PATENT DOCUMENTS

| 561,755 | 6/1896 | Barr | 126/425 |
|---|---|---|---|
| 4,154,221 | 5/1979 | Nelson | 126/425 |
| 4,211,212 | 7/1980 | Braun | 126/440 |
| 4,242,580 | 12/1980 | Kaplow | 126/425 |
| 4,263,892 | 4/1981 | Little | 126/424 |

FOREIGN PATENT DOCUMENTS

| 2742014 | 3/1978 | Fed. Rep. of Germany | 126/425 |
|---|---|---|---|
| 2715334 | 10/1978 | Fed. Rep. of Germany | 126/425 |

*Primary Examiner*—Samuel Scott
*Assistant Examiner*—G. Anderson
*Attorney, Agent, or Firm*—Albert F. Kronman

[57] ABSTRACT

A solar ray reflector of semi-hemispherical form is joined at its periphery to one end of a short rigid cylindrical support member fixed to trunnion tubes extending through diametrically opposite sides of the support member and rotating in bearings on an equatorial axis which are held by a mounting frame. The reflector faces the sun and a space on the focal plane of the reflector between two flanges on the interior ends of the two trunnion tubes contains a fixed cylindrical heat exchanger supported on fixed water supply connecting pipes within the rotatable trunnion tubes. A liquid evaporating heat sensor and metal bellows thrust motor is supported on the flanges and is placed on one side next to the heat exchanger. Travel of the sun's image off the heat exchanger and on to the sensor expands the metal bellows longitudinally to provide a motor thrust which is stored in a compression spring and then released by a trigger with sufficient to activate a translating mechanism which quickly rotates the reflector through an angle restoring the sun's image to a position on the opposite side of the heat exchanger. During the time of travel of the sun's image across the heat exchanger the vapor in the thrust motor is cooled and condensed and the bellows contracts resetting the mechanism for another image restoring cycle. Water circulated through the heat exchanger is heated for an external water system while the sun's image is present on the heat exchanger and the reflector is stationary.

6 Claims, 5 Drawing Figures

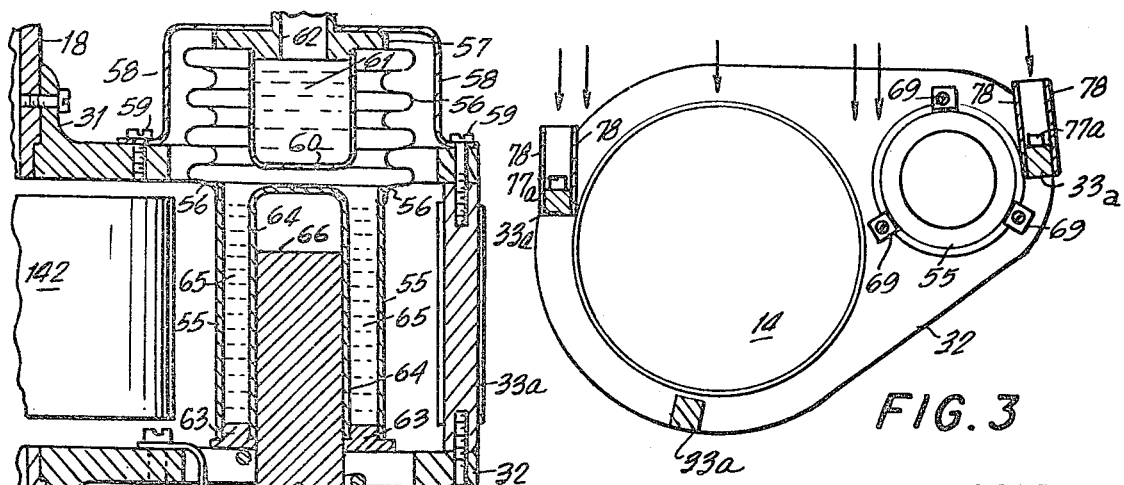
FIG. 3
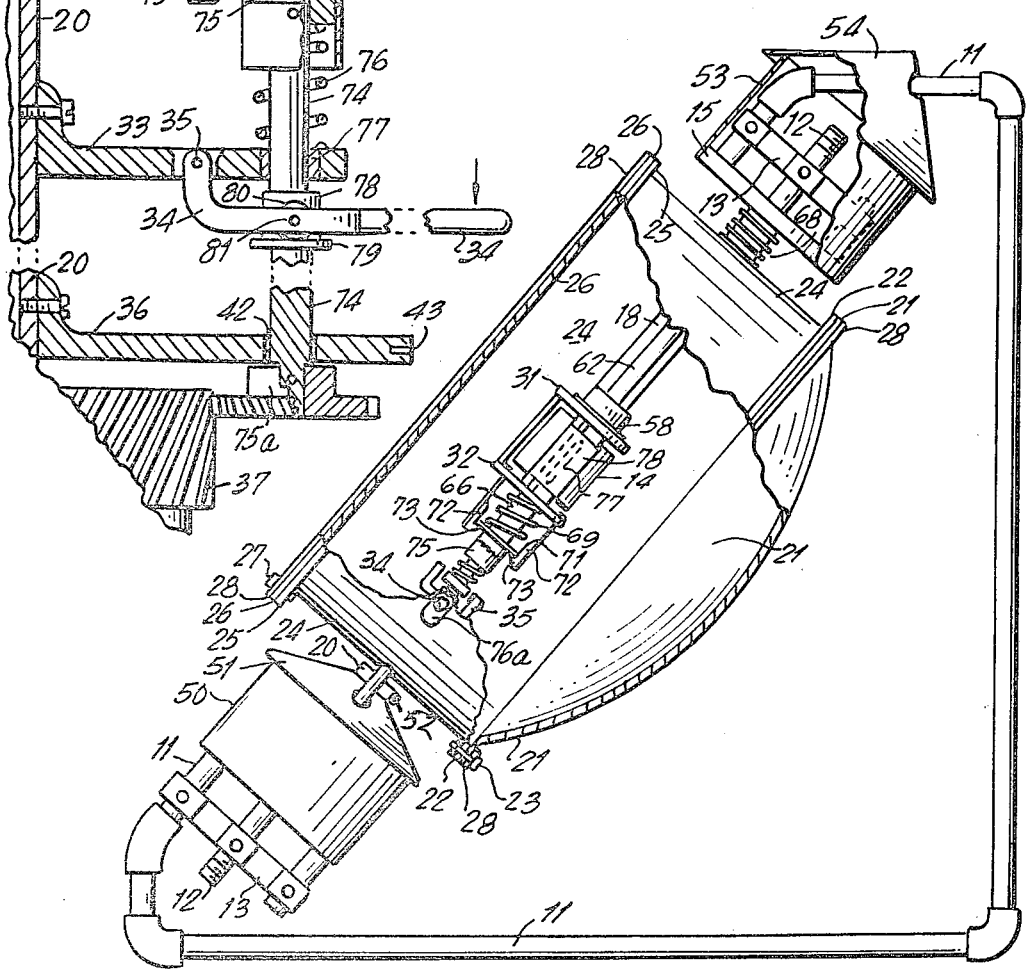
FIG. 4
FIG. 2

SUN POWERED AUTOMATIC SUN FOLLOWING REFLECTOR

BACKGROUND OF INVENTION

Sun following reflectors have previously been of parabolic form and have required the use of complex electronic sun position sensors and expensive servo-mechanisms to continuously track the sun's position. In a parabolic reflector, the image of the sun is fixed at the focal point on the axis of the reflector, requiring continuous angular movement of the reflector to retain the sun's image at the focal point.

The present invention avoids complexity and expense by the novel use of the optical properties of a reflector of spherical form. In a spherical reflector, the image of the sun at the focal point of the reflector can traverse a limited distance along the focal plane while the reflector remains fixed. The present invention utilizes this property of a spherical reflector by placing a novel combined heat sensor and thrust motor in the form of a sealed expandable metal bellows in the focal plane of the spherical reflector to one side of a fixed heat exchanger placed at the axial focal point of the reflector and supporting the heat sensor and thrust motor to rotate with the reflector, so that travel of the sun's image off the heat exchanger and on to the heat sensor while the reflector is stationary develops a motor thrust which is stored by compressing a spring. The stored energy is released when sufficient and is translated by a mechanism into an angular rotation of the reflector which quickly returns the sun's image to the heat exchanger. The fixed heat exchanger placed at the focal point absorbs heat during the time of travel of the sun's image across it, while the bellows is cooled and contracts and the storage mechanism resets during this time to be ready for a succeeding image restoring cycle. The novelty of the invention resides in the placement and use of a combined heat sensor motor, together with the use of an energy storage and thrust translating mechanism to accomplish the angular steering of a reflector of spherical form to periodically restore the position of the sun's image to the focal point after it periodically departs from that point. The heat of the sun is thus utilized in a novel way by the present invention to provide both error sensing and motive power for automatic image restoration which enables the heat of the sun to be usefully employed by keeping the sun's image focussed on a heat exchanger placed at the focal point of the reflector and connected by pipes to an associated water heating system.

SUMMARY OF INVENTION

A formed semi-hemispherical reflector having an interior spherical reflective surface laminated to a formed thin sheet of structurally suitable material is joined around its periphery to one end of a short rigid cylindrical support member of structurally suitable material. The support member has a flat flange around its circumference, and the formed reflector is held to the upper flange by bolts through a clamping ring. The other end of the cylindrical support member is also flanged and a transparent protective cover of suitable thin plastic material is held to the flange by bolts through a clamping ring. Two metal trunnion tubes are joined to the cylindrical walls on diametrically opposite sides of the cylindrical support member and are held to the walls by bolts through angle collars fixed to the outside of the trunnion tubes. The interior ends of the trunnion tubes are fitted with specially formed flanges which are spaced and joined by tie rods to provide a space between the flanges at the focal point of the spherical reflector. The focal point of a spherical reflector is given by R/2 where R is the spherical radius of the reflector. The space between the trunnion tube flanges along the focal plane contains a fixed heat exchanger of cylindrical form, supported at each end by fixed connecting pipes passing through the center of the trunnion tubes which can rotate around them. The connecting pipes are fixed to the frame of the complete reflector assembly and convey water through the heat exchanger from an associated water heating system. The two trunnion tubes and the attached reflector can rotate around the heat exchanger connecting pipes in bearings at the external ends of the trunnion tubes. The bearings are placed on an equatorial axis and held in plates attached to the mounting frame. The lower trunnion bearing is placed in a mounting plate carrying other parts of the assembly. The two spaced flanges on the interior ends of the rotatable trunnion tubes are elongated at one side to provide a space for mounting the heat sensor and bellows thrust motor in the focal plane next to the fixed cylindrical heat exchanger. An inverted cup holds the upper end of the bellows and is fastened to the upper trunnion tube flange. Holes in the cup allow a convection current of air to rise past the bellows to cool it during the time the sun's image is traversing the outside surface of the cylindrical heat exchanger. The upper end of an annular cylindrical flash boiler is joined to the lower end of the bellows. The interior diameter of the annular boiler fits over a guide rod extending below the boiler within the interior of a compression spring, the lower end of which abuts against a projecting catch flange on the lower end of the guide rod. The lower end of the guide rod is fastened to the upper member of a one way ratchet type clutch, and the guide rod projecting catch flange enables compression of the spring when caught by means of triggered hooks on the lower end of three long flexible trigger arms held by the lower trunnion tube flange. The three long, thin trigger arms are equally spaced around the bellows and spring and are held on their upper ends by the lower flange. Each arm has an upper thin leaf spring flexible portion, a lower thick inward projecting curved cam portion, and a trigger hook on its lower end which hooks under the projecting catch flange on the lower end of the guide rod to normally confine the lower end of the spring. The lower end of the one way clutch is fastened to a drive rod passing through a bushing in an upper bracket arm radially projecting from the lower trunnion tube. The lower end of this drive rod is fastened to a helical pinion gear with a narrow face which is meshed with a large diameter helical gear with a wide face which is held fixed on the lower bearing plate in a position outside of and concentric with the lower trunnion tube. A compression spring is placed on the pinion gear driving rod between the lower clutch member and the upper trunnion tube arm.

In operation, while the reflector is stationary and facing the sun, the sun's image travels across the surfce of the fixed heat exchanger which is located on the reflector focal plane, thus usefully heating water circulated through the heat exchanger. In a short time the sun's image travels off the heat exchanger along the focal plane and onto the heat sensor. The heat sensor is very quickly heated by the sun's image and its flash boiler provides expanding vapor which expands the bellows longitudinally thus compressing the energy storage spring which is normally caught and held at its lower end by the trigger hooks on the ends of the trigger arms. When the bellows expands sufficiently a projecting flange on the lower end of the flash boiler reaches the trigger release cams and spreads the leaf spring trigger arms thus releasing the trigger hooks from the catch flange and freeing the lower end of the compressed energy storage spring to thrust the one way clutch and its rod connected helical pinion gear downward and compressing the clutch spring. The pinion gear when driven downward on its mating helical gear is held from rotation by the one way clutch and the stationary helical gear acts as a helical cam, imparting an angular rotary movement to the lower trunnion tube arm by means of the pinion gear thrust rod and thus rotating the attached reflector. The angular movement of the reflector on its equatorial axis causes the sun's image to quickly travel back acoss the surface of the heat exchanger to the side opposite from the heat sensor, to start another heating cycle as the sun's image traverses the surface of the heat exchanger. During the time of travel of the sun's image across the heat exchanger the bellows cools off and contracts assisted by a heat pipe which absorbs heat from the expanded hot vapor and the clutch compression spring returns the normally expanded energy storage spring to its normal position within the spring trigger arms and again confined by the hooks on their lower ends, while the drive pinion gear rises while meshed with the fixed helical gear and rotates freely due to the one way clutch. The axial length of the cylindrical heat exchanger and heat sensor is chosen to permit focussing of the sun's image on them along the equatorial axis during seasonal variations of the sun's elevation angle at a particular location. The upper interior part of the bellows contains a heat pipe liquid reservoir with a connecting pipe to a condenser located externally to the support member. The liquid in the heat pipe reservoir is chosen to have a boiling point lower than that of the liquid in the flash boiler, so that latent heat absorbed in boiling the heat pipe liquid is taken from the vapor inside the bellows. The vapor of the heat pipe liquid is cooled in an external condenser at the end of the heat pipe and the liquid returns to the heat pipe reservoir.

In the invention, provision is made to continue operation during periods of cloudy weather by use of two photocell sensors which sense the sun's image at their positions outside of the heat exchanger and the heat sensor. The photoelectric sensors control a small electric motor geared to the lower trunnion tube, so that when the sun's image passes over the heat sensor and has not had sufficient heat to activate the thrust motor, the image falls on the photoelectric sensor and starts the motor to turn the reflector until the image falls on the photoelectric sensor on the opposite side of the heat exchanger and stops the motor. The sun's image can then traverse the heat exchanger again. These photoelectric sensors and associated electronic circuitry are powered by a small storage battery which is kept charged by voltaic generating solar cells attached to one side of the reflector. The voltage output of the solar cells is also used in an electronic comparator which can decide automatically when darkness should terminate normal operation of the reflector assembly. The invention also makes provision for automatically returning the reflector to its morning position when the sun is low in the western sky. The lower trunnion tube arm has a small permanent magnet placed at its end, and hall effect magnetic field sensors are placed in fixed angular positions on the lower bearing plate. These sensors are placed for summer and winter sun angles and are electrically switched. The lower trunnion tube arm rotates during the day and its magnet generates a signal in a western sensor at the end of the day. The signal starts the motor, which rotates the reflector to its morning position, where the magnet generates a signal in an eastern sensor which stops the motor. In the event that these provisions fail to return the reflector to its morning position, a declutching lever is provided which drives a collar on the pinion drive rod compressing the clutch spring and separating the clutch faces. The reflector can then be turned by hand.

The electronic control circuitry is simple and uses a very small amount of current at a low voltage. A small solar voltaic cell assembly and a small storage battery suffice to supply this.

Therefore, it is an object of the invention to provide a sun powered heat motor with an automatic sun following spherical reflector which directs the heat of the sun on a fixed heat exchanger for heating water in an associated water system.

Another object of the invention is to provide alternate photoelectric detection means for automatic sun following in cloudy weather.

Another object of the invention is to provide automatic magnetic detection means operating in the afternoon to return the reflector to its morning position.

Still another object of the invention is to provide automatic means for detecting darkness and, deactivating the automatic sunfollowing.

These objects and features of the present invention and the construction of the invention can be understood from the accompanying drawings and the following written description.

BRIEF DESCRIPTION OF THE DRAWINGS

FIG. 2 is a partial section of the reflector assembly, cut away to show a side view of the mechanism, and showing the mounting frame.

FIG. 3 is a plan view of the lower trunnion tube flange somewhat enlarged showing positions of the fixed heat exchanger, heat sensor and auxiliary photoelectric sensors, with angular ray arrows denoting the direction of rays of the sun's image returning from the spherical reflector.

FIG. 4 is an enlarged sectional view of the driving and translating mechanism.

DESCRIPTION OF PREFERRED EMBODIMENT

Figure 1:
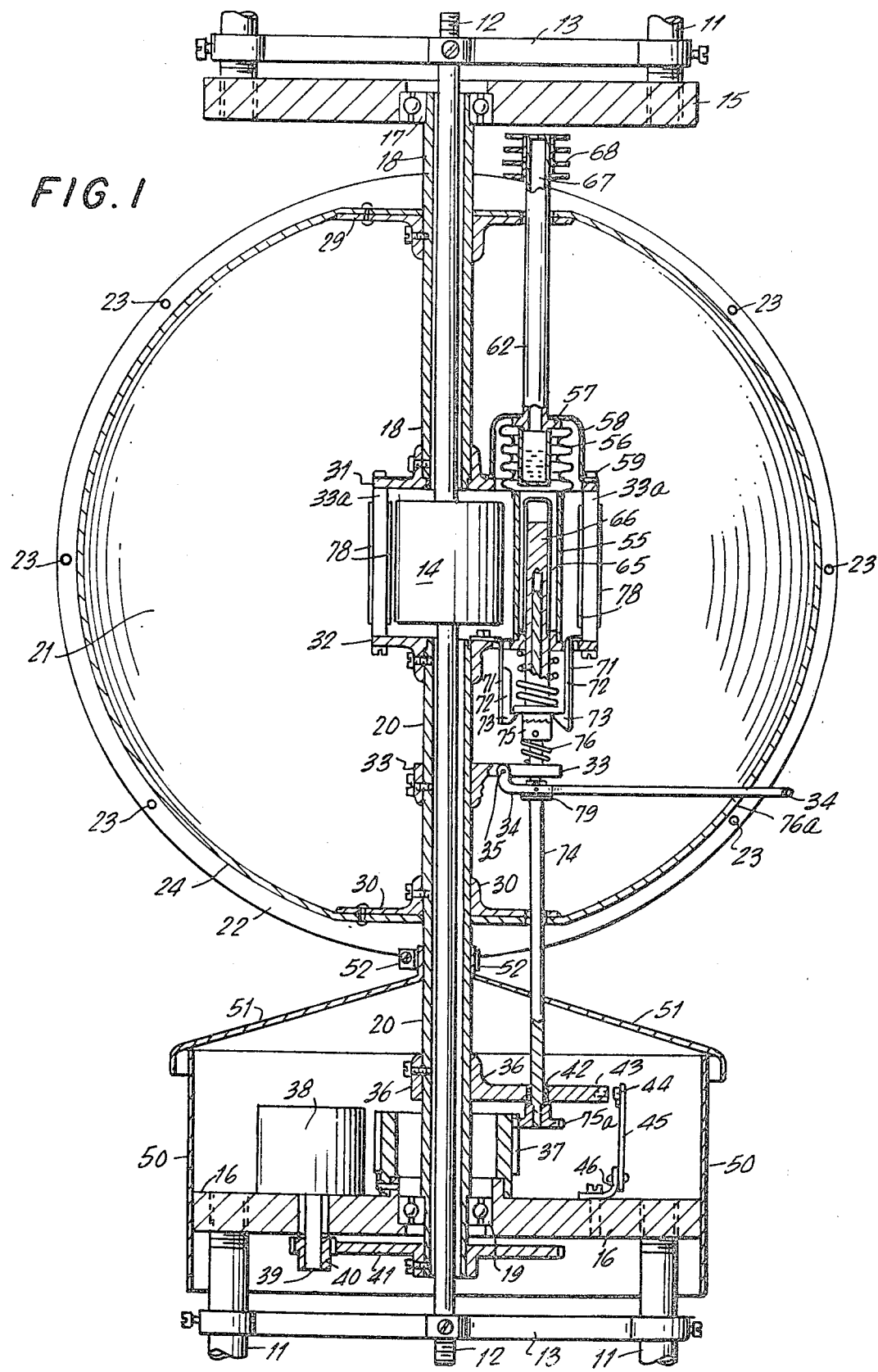
FIG. 1 is a section taken through the center of the reflector assembly at the focal plane of the spherical reflector, looking along the axis of the reflector from the position of the sun, and showing the mechanism.

Referring to FIGS. 1-3, a pipe frame 11 supports fixed connecting pipes 12 by spaced brackets 13. Pipes 12 support and connect to fixed cylindrical heat exchanger 14 for circulation of water through the heat exchanger from an associated water heating system (not shown). Pipes 11 screw into an upper bearing plate 15 and a lower bearing plate 16. A bearing 17 fits externally in plate 15 and internally over the upper end of upper trunnion tube 18. A bearing 19 fits externally in plate 16 and internally over the lower end of lower trunnion tube 20. Reflector 21 is held to flange 22 by bolts 23 through clamping ring 28. Circular flange 22 is joined to one end of cylindrical support member 24, the other end of which has a flange 25 supporting a transparent thin cover 26 held to flange 25 by bolts 27 through clamping ring 28. The upper trunnion tube 18 is fastened to cylinder support member 24 by bolts in collar 29 while the lower trunnion tube 20 is fastened to cylinder support member 24 by bolts in collar 30. An upper flange 31 is fastened to upper trunnion tube 18, and a lower flange 32 is fastened to lower trunnion tube 20. Tie rods 33a fasten flange 31 to flange 32. Fixed heat exchanger 14 fits in the space between flanges 31 and 32, supported by the fixed connecting pipes 12 passing through the center of the larger trunnion tubes 18 and 20 which can freely rotate around the fixed pipes, carrying the reflector 21 with them. A projecting arm 33 is fastened to trunnion tube 20 below lower flange 32 and has declutching lever 34 pivoted to it by bolts 35. A projecting arm 36 is fastened to trunnion tube 20 near bearing plate 16. A helical spur gear 37 is fastened to bearing plate 16 in a concentric position around bearing 19. A motor 38 is fastened to bearing plate 16 with its shaft 39 projecting downward and fastened to pinion spur gear 40, which meshes with spur gear 41 fastened to the lower end of trunnion tube 20. Arm 36 is bored for a bearing 42 and is bored at its end to fit a permanent magnet 43. A hall effect sensor 44 is fastened to a printed circuit board 45 mounted by a bracket 46 to bearing plate 16. Three other hall effect sensors 47, 48, and 49 are mounted similarly, at angular positions shown on FIG. 5. A cylindrical weather protective enclosure 50 surrounds and is fastened to lower bearing plate 16, with a conical weather protective roof 51 fastened to rotating lower trunnion tube 20 by clamp 52. A cylindrical weather protective enclosure 53 surrounds and is fastened to upper bearing plate 15 with a conical weather protective roof 54 fastened to enclosure 53.

A flash boiler type heat sensor 55 is attached by brazing to a metal bellows 56 at the lower end of the bellows 56. The upper end of the bellows 56 is attached by brazing to a mounting plate 57 with a brazed attached cylindrical mounting cup 58 which is held to the upper flange 31 by screws 59. A reservoir 60 holds a liquid 61 and is brazed to plate 57. A heat pipe 62 is brazed to plate 57 and allows vapor generated by the boiling of liquid 61 to pass upward in pipe 62. The lower end of heat sensor boiler 55 is brazed to the outer shoulder of an annular metal ring 63, which has tube 64 brazed to its inner shoulder, thus forming a sealed enclosure filled with liquid 65. Liquid 65 as shown in FIGS. 1 and 2 has a higher boiling point than liquid 61, so that latent heat used in boiling liquid 61 is extracted from the vapor boiled from liquid 65 in order to quickly cool the bellows 56 to allow its contraction after an expansion caused by vapor pressure from boiling liquid 65. The vapor boiled from liquid 61 rises in heat pipe 62 and reaches the comparatively cool end 67 which has cooling fins 68 exposed to the air outside the reflector. The vapor from liquid 61 condenses at the end 67 of heat pipe 62 and flows back through pipe 62 to reservoir 60. Guide rod 66 can slide inside tube 64 which acts to properly align rod 66. A compression spring 69 surrounds rod 66 and is held between ring 63 and a projecting shoulder catch 70. The ends of spring 69 are indented in ring 63 and shoulder 70 to prevent rotation of rod 66. Three flexible leaf spring fingers 71 have a cam portion 72 and a lower hook portion 73 which hooks under shoulder catch 70. The three fingers 71 are equally spaced around spring 69.

Vapor pressure caused by heating liquid 65 raises pressure inside bellows 56, expanding the bellows and driving ring 63 downward compressing spring 69, until the outer diameter of annular ring 63 hits cam 72 and spreads fingers 71 causing hooks 73 to release catch 70 (as best shown in FIG. 4). Guide rod 66 is bored for a sliding fit on drive rod 74, with ratchet teeth formed on the end of rod 66, to form the upper half of a one way clutch. Drive rod 74 has the lower half of the ratchet tooth clutch 75 fastened to it and a clutch spring 76 is placed around rod 74 between lower clutch member 75 and projecting arm 33. A bearing 77 in arm 33 allows rod 74 to either rotate or move longitudinally. A collar 78 with a projecting lower flange 79 is fastened to rod 74 below arm 33. Rollers 80 rotate on pins 81 in declutching lever 34 and bear on flange 79 to separate the clutch members 70 and 75 when lever 34 is depressed in the direction of the arrow. The lower end of drive rod 74 carries a helical spur gear 75a with a narrow face fastened to it, with gear 75a meshed with helical gear 37 which is fixed to lower bearing plate 16. Declutching lever 34 protrudes through a slot 76a in the side of support member 24 as shown in FIGS. 1 and 2. Referring to FIG. 3, two tie rods 33a which space the upper flange 31 and lower flange 32 are square and have photoelectric sensors 77a mounted on them facing the reflector, with side hoods 78 attached to the sides of spacers 33a. The sensors 77a are located on each end of the flange 32 beyond the surfaces of the heat exchanger 14 and the heat sensor 55, and are used to provide an auxiliary signal to the electronic control unit when the heat of the sun's image is insufficient to operate the heat sensor 55. When the sun's image travels over the surface of sensor 55 and does not provide enough heat for its operation, the image travels beyond sensor 55 and appears between the side hoods 78, activating that photoelectric sensor to send a signal to the electronic control circuit which starts motor 38 rotating the reflector until the sun's image appears within the side hoods 78 of the photoelectric sensor 77a at the opposite side of the heat exchanger. This sensor then sends a signal to the electronic control circuit which stops the motor. The sun's image then traverses the surface of the heat exchanger for another heating cycle, although less heating occurs due to the lower heat of the sun's image on the heat exchanger.

Figure 5:
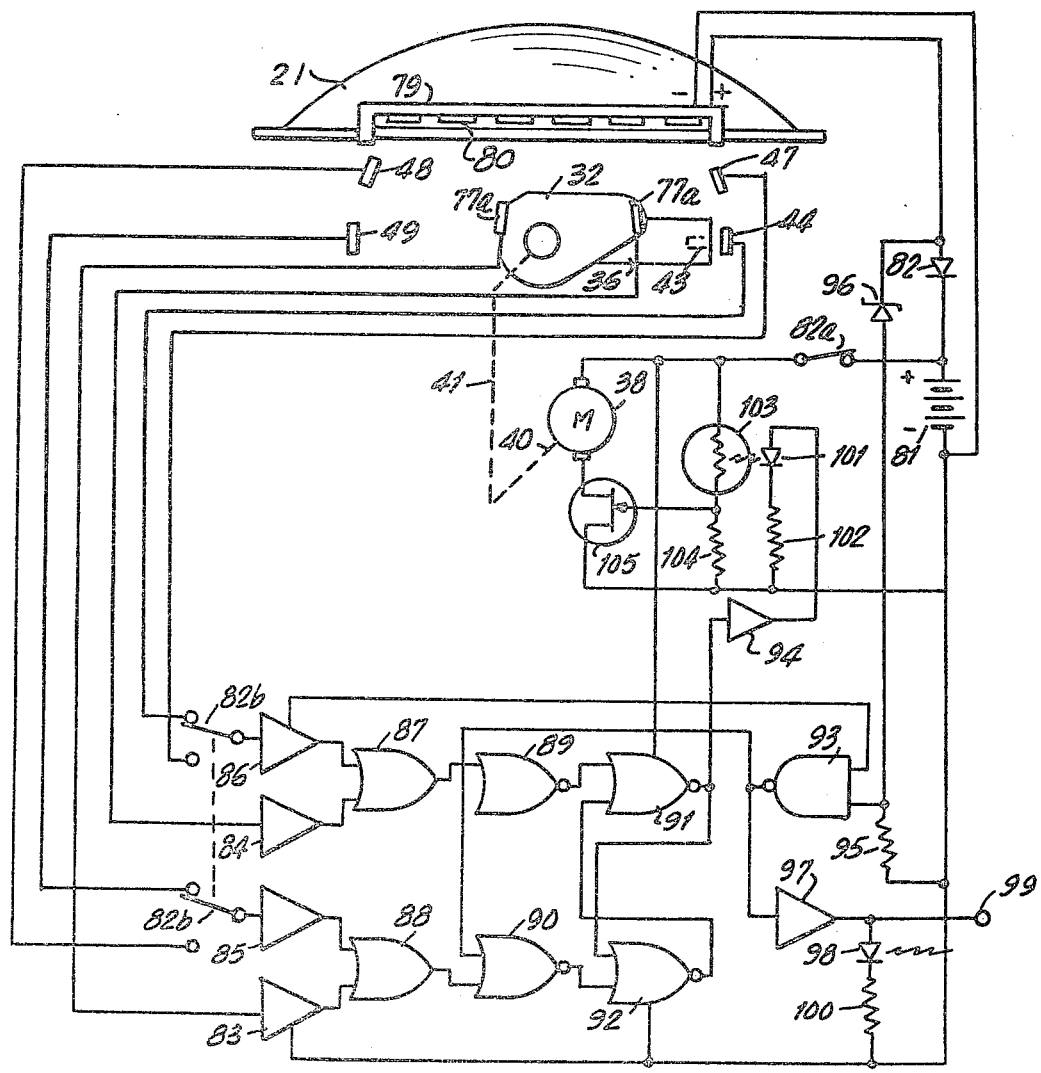
FIG. 5 is a schematic diagram showing the electronic circuitry, solar voltaic cells and battery used for auxiliary control of the angular position of the reflector.

Referring to FIG. 5, which is a schematic diagram of the electronic control circuit, the reflector 21 has fastened to it a panel 79 containing twelve small solar voltaic cells 80 facing the sun which are series connected to furnish 6 volts when the sun is shining on them. The cells 80 are connected to a storage battery 81 through a blocking diode 82 which prevents battery discharge through the cells, and charge storage battery 81. Battery 81 is connected through on-off switch 82a to supply operating voltage to the electronic control circuit. A double pole double throw switch 82b selects summer hall effect sensors 44 and 49 or winter sensors 47 and 48. Sensors 44 and 49 allow a greater angle of reflector travel than sensors 47 and 48, according to summer and winter travel of the sun through the sky. Photoelectric sensors 77 are connected to signal conditioning amplifiers 83 and 84, while the two outputs from switch 82b are connected to signal conditioning amplifiers 85 and 86. The signals from the amplifiers 83, 84, 85, and 86. are positive voltage digital "one" signals after signal conditioning of a positive voltage signal from the respective sensors 44, 47, 48, 49, and 77a. The output of amplifiers 84 and 86 are connected to the input terminals of or gate 87 while the output of amplifiers 83 and 85 are connected to the input terminals of or gate 88. The four nor gates 89, 90, 91, and 92 comprise a gated rs flip flop which allows the memorization of a logic input state only when required, by controlling the input gates. The or gate 87 output is connected to one input of nor gate 89, with the other input of nor gate 89 connected to the output of nand gate 93. The or gate 88 output is connected to one input of nor gate 90, with the other input of nor gate 90 also connected to the output of nand gate 93. The output of nor gate 91 is connected to the input of buffer 94 and an input of nor gate 92 with the other input of nor gate 92 connected to the output of nor gate 90. The output of nor gate 92 is connected to an input of nor gate 91, with the other input of nor gate 91 connected to the output of nor gate 89. These connections form the desired gated rs flip flop. Nand gate 93 has one input connected to the positive supply voltage while the other input of gate 93 is connected to the resistor 95 at its junction with zener diode 96 which is connected to the solar cell positive output. The output of nand gate 93 is also connected to a buffer 97, the output of which is connected to a light emitting diode 98 and an output terminal 99. A dropping resistor 100 drops the voltage from buffer 97 to the proper led operating voltage. The output of buffer 94 is connected to light emitting diode 101 and a dropping resistor 102 drops the voltage from buffer 94 to the proper led operating voltage. When led 101 is excited by a positive voltage from buffer 94 the led illuminates the photocell 103 which is connected in series with resistor 104 across the supply voltage. The junction between photocell 103 and resistor 104 is connected to the gate of a field effect transistor 105 placed in series with motor 38 across the power supply voltage. With switch 82a placed as shown, the magnet 43 generates a signal voltage in hall effect sensor 44 which is connected through switch 82b to the input of amplifier 86, the output of which is a digital "one" positive logic voltage and is transmitted to the input of or gate 87. The output of or gate 87 is "one" and is applied to the input of nor gate 89. The output of hall effect sensor 49 is "zero" through switch 82b to the input of amplifier 85, the output of which is "zero." The "zero" output of amplifier 85 and its connected input to or gate 88 makes the output of or gate 88 a "zero," which is applied to the input of nor gate 90. A "one" at the input of nor gate 89 and a "zero" at the input of nor gate 90 makes a "one" at the output of nor gate 91 which is transmitted to buffer 94. Zener diode 96 passes current because the solar cell voltage is high in daylight and digital "one" appears at one input of nand gate 93 while the other input already is connected to the power supply positive voltage and has a digital "one." Under conditions of digital "ones" on both nand gate inputs, the output of the nand gate 93 is a "zero" and is applied to the inputs of nor gates 89 and 90 allowing the memorization of the digital 37 one" at the output of nor gate 91 caused by the "one" input from or gate 87. The "one" output from buffer 94 lights led 101 and illuminates photocell 103 reducing the P.E.C. resistance and driving F.E.T. 105 to conduction, thus starting motor 38. Motor 38 turns the reflector 21 through gears 40 and 41 until the arm 36 traverses the angle between sensors 44 and 49, when magnet 43 generates a voltage in hall effect sensor 49. The voltage from sensor 49 is conducted by switch 82b to the input of amplifier 85 and the digital "one" output of amplifier 85 is transmitted to the input of or gate 88, the output of which is a "one" transmitted to an input of nor gate 90. The "one" at nor gate 90, and a "zero" at the input of nor gate 89 due to zero signal voltage from sensor 44, causes the reversal of the rs flip flop outputs, so that nor gate 91 output is a "zero," buffer 94 output is a "zero," and led 101 is dark. P.E.C. 103 dark resistance is very high so that the gate of F.E.T. 105 is cut off and the F.E.T. does not conduct, stopping motor 38. In the event of cloudiness during the day, snesors 77a give output voltages conditioned by amplifiers 83 and 84 and control the logic through or gates 87 and 88 in a similar manner to the previous description. If the sunlight is failing and insufficient, the solar cell voltage output drops and falls below the conduction voltage of the zener diode 96, so that a "zero" appears across resistor 95 and is applied to one input of the nand gate 93. The output of the nand gate 93 is then caused to be a "one" and is applied to the inputs of nor gates 89 and 90, thus leaving the rs flip flop in its last memorized state and preventing a change from that state. If the sun's image had disappeared so that proper operation of the reflector was impossible, the nand gate 93 output of "one" is transmitted through buffer 97 to led 98 and lights this led to inform the user of the fact. Terminal 99 can be connected to external auxiliary equipment which it is desired to operate. Switch 82a may be opened to stop operation of the electronic circuit if desired.

In normal operation during sunlight hours with the sun shining in a clear sky, the reflector 21 is set at a desired angle in the morning by sensor 49 in the summer months. Switch 82b is set to receive a signal from sensor 44. When the sun reaches a desired angle its image traverses the surface of the heat exchange 14 and heats it. The sun's image then travels off the heat exchanger 14 and on to heat sensor 55, heating the liquid 65 in the heat sensor and causing liquid 65 to boil and vaporize. The vapor of liquid 65 pressurizes bellows 56 and causes it to expand downward as its top is held stationary by cup 58 attached to flange 31. Annular ring 63 is driven down by the expansion of bellows 56, compressing spring 69, the lower end of which is held stationary by hooks 73 under catch flange 70. When ring 63 reaches cam 72 it spreads spring fingers 71 and the catch 70 is released from hooks 73, allowing the stored energy of compressed spring 69 to push clutch member 75 and drive rod 74 downward. Pinion gear 75a on the end of drive rod 74 is driven downward while meshed with helical gear 37. The pinion gear 75 cannot rotate to follow the helix of gear 37 because of one way clutch 75. The helical path of the teeth of gear 37 acts as a helical cam, with the pinion gear 75a a cam follower. As the teeth of pinion gear follow the helix angle of gear 31, the connected drive rod 74 quickly rotates the arm 36 through the helix angle as the gear 75a is held from rotation, thus also rotating the reflector through this angle and returning the sun's image to the opposite side of the heat exchanger 14 for another traversal of the heat exchanger. During the time that the sun's image traverses the heat exchanger 14 the vapor in the bellows 56 is cooled. Cooling is speeded by absorption of heat from the vapor inside the bellows 26 by the latent heat required to boil the liquid 61 contained in the heat pipe reservoir 60. Air also cools the outside of bellows 56. When bellows 56 contracts as the vapor condenses inside it, heat sensor 55 rises and spring 76 pushes clutch 75 against guide rod 66 within tube 64. When bellows 56 is fully retracted, catch flange 70 rises past hooks 73 which snap into normal position beneath flange 70 and confine spring 69 for another cycle of operation.

While the preferred embodiment of the invention has been described, the form of the invention should be considered as illustrative and not as limiting the scope of the following claims:

I claim:

1. A solar powered sun following reflector comprising:
   (a) a substantially rigid frame,
   (b) spaced bearings carried by the frame,
   (c) a first and a second elongated trunnion tube rotatably carried at each outer end in the spaced bearings and disposed along a common equatorial axis, said trunnion tubes being spaced from each other at their unsupported inner ends,
   (d) a reflector having a substantially hemispherical shape diametrically secured to the trunnion tubes,
   (e) a first and a second fluid conduit secured at their outer ends to the frame, extending inwardly toward the center of the reflector and spaced from each other at their inner ends,
   (f) a heat exchanger operatively coupled between the inner ends of the first and second fluid conduits and disposed at the focal point of the reflector,
   (g) reflector drive means carried by the trunnion tubes, positioned in the focal plane of the reflector and laterally of the heat exchanger,
   (h) ratchet means operatively coupled between the drive means and the reflector whereby solar energy directed upon the drive means by the reflector when the solar rays are displaced from the heat exchanger will return the reflector to its optimum position with respect to the heat exchanger.

2. Apparatus according to claim 1 in which the drive means is a heat actuated expanding vapor thrust motor.

3. Apparatus according to claim 1 in which the drive means comprises a source of electrical power, an electric motor connected to the power source and responsive to spaced first and second photoelectric pickup units carried by the trunnion tubes.

4. Apparatus according to claim 2 in which the vapor thrust motor is provided with a drive rod responsive to the thrust of said motor and operatively coupled to the reflector.

5. Apparatus according to claim 2 in which a drive rod is coupled to the reflector by a one way ratchet clutch and a gear train to convert the axial thrust of the drive rod into rotary power to swing the reflector through an arc.

6. Apparatus according to claim 3 in which the first and second photoelectric pickup units are spaced from each other on each side of the heat exchanger to receive light from the reflector.

* * * * *